United States Patent [19]

Ditlinger

[11] 3,977,274
[45] Aug. 31, 1976

[54] TENSION-TORSION TIE BAR

[75] Inventor: Richard J. Ditlinger, South Bend, Ind.

[73] Assignee: The Bendix Corporation, South Bend, Ind.

[22] Filed: Sept. 26, 1975

[21] Appl. No.: 616,977

[52] U.S. Cl. ............................................. 74/579 R
[51] Int. Cl.² ........................................ G05G 1/00
[58] Field of Search............ 74/579 R, 581; 403/220

[56] References Cited
UNITED STATES PATENTS

| | | | |
|---|---|---|---|
| 3,362,253 | 1/1968 | Ditlinger | 74/579 R |
| 3,370,483 | 2/1968 | Ditlinger | 74/579 R |
| 3,388,615 | 6/1968 | Ditlinger | 74/579 R |
| 3,411,379 | 11/1968 | Deyerling | 74/579 R |
| 3,475,988 | 11/1969 | Ditlinger et al. | 74/579 R |
| 3,692,361 | 9/1972 | Ivarsson | 74/579 R X |
| 3,782,220 | 1/1974 | Ditlinger | 74/579 R |

Primary Examiner—Leonard H. Gerin
Attorney, Agent, or Firm—Gordon H. Chenez; William N. Antonis

[57] ABSTRACT

A tie bar or flexible coupling particularly adapted to interconnect a helicopter rotor arm and a rotor blade is provided with a pair of spaced-apart end bushings connected by an endless belt which belt is defined by a plurality of spaced-apart parallel wires suitably integrated by a polyurethane adhesive. A pair of spaced-apart annular clips located between the end bushings surround the belt and draw opposite sides of the belt inwardly toward an axis extending through the end bushings about which axis the tie bar is adapted to twist under load. Opposing surfaces of each clip against which the belt sides bear are curved to form convex bearing surfaces causing the belt sides to assume a corresponding convex shape thereby deflecting the outer or edge wires less than the inner or center wires resulting in a lower tensile force imposed on the outer or edge wires than the inner or center wires during twisting motion of the belt about the axis thereof.

6 Claims, 4 Drawing Figures

U.S. Patent  Aug. 31, 1976  3,977,274
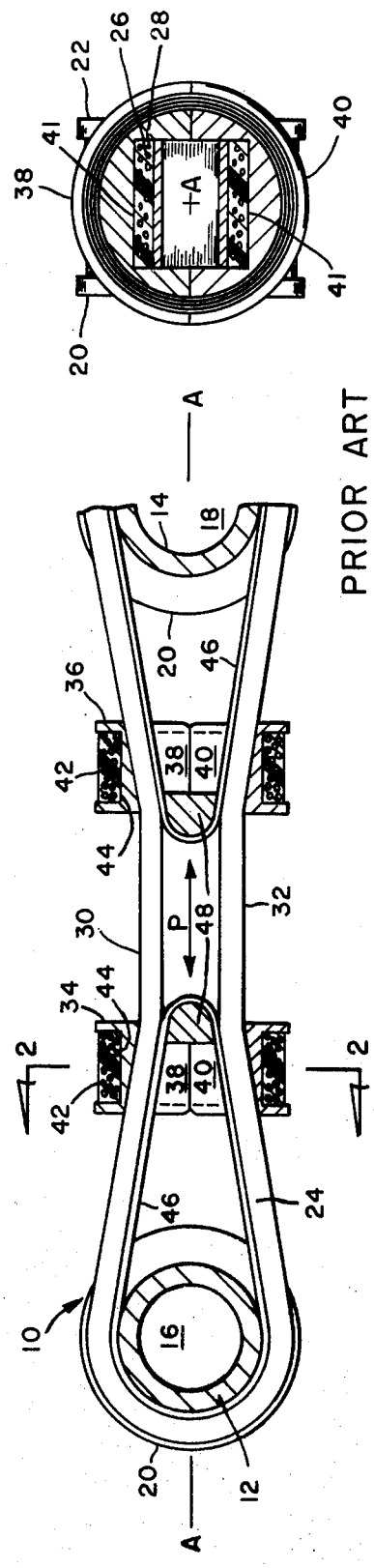
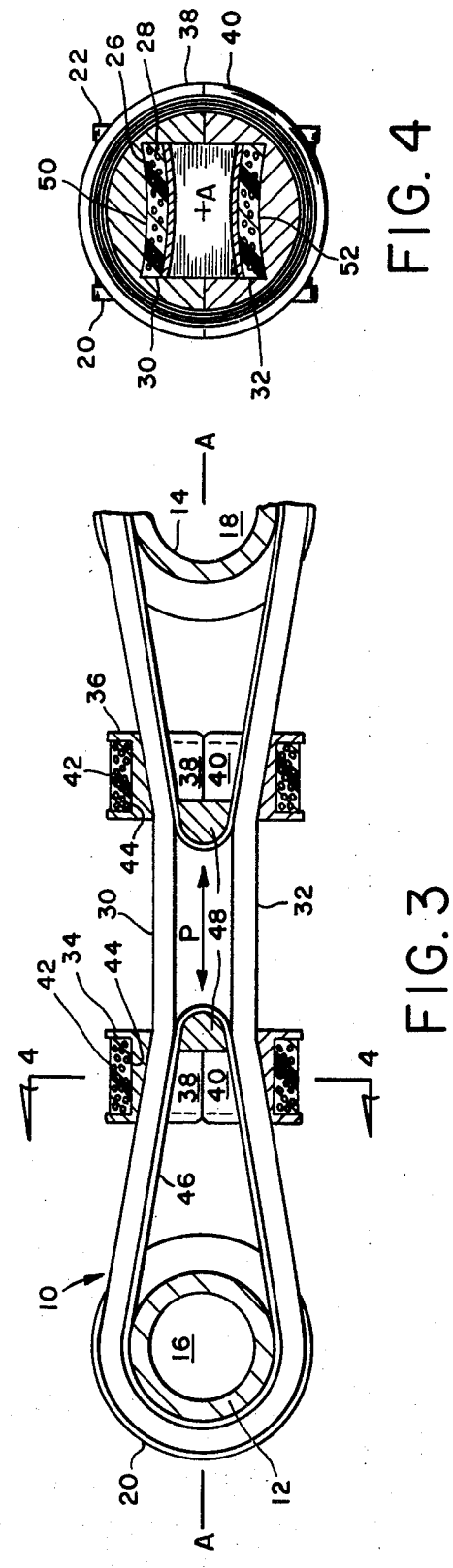

TENSION-TORSION TIE BAR

BACKGROUND OF THE INVENTION

Tie bars or couplings having a pair of end bushings connected by a wire-wound polyurethane impregnated endless belt are well known as evidenced by U.S. Pat. No. 3,782,220 issued Jan. 1, 1974 to R. J. Ditlinger (common assignee). The present invention represents an improvement over the tie bar of U.S. Pat. No. 3,782,220.

It has been found that the wires in the prior art tie bars of U.S. Pat. No. 3,782,220 are subject to uneven stress during twisting motion about the longitudinal axis of the tie bar which uneven stress results from the spacing variations of the wires relative to the longitudinal axis of the tie bar with the outermost or edge wires being farthest from the axis thereby having the greatest stress. It will be recognized that the ideal solution would be to have all wires equally stressed under a maximum twist condition of the tie bar. However, the ideal solution is not economically feasible and alternative more practical solutions must be resorted to. To that end, the present invention proposes modification of the clip structure only of the tie bar to effect a stress reduction in the highly stressed outer or edge wires.

SUMMARY OF THE INVENTION

The present invention relates to a flexible coupling commonly known as a tie bar capable of withstanding both tension and torsion loads.

It is an object of the present invention to provide a flexible wire-wound belted tie bar adapted to twist about a longitudinal axis and provided with clamp means having convex bearing surfaces against which opposite sides of the belt bear to thereby reduce the tensile force imposed on the wires as a function of the curvature of said convex surface.

It is another object of the present invention to provide a flexible wire-wound polyurethane impregnated belt or tie bar having clamp means encircling the tie bar and provided with curved bearing surfaces against which opposite sides of the belt bear causing the same to curve transversely thereby distributing an applied load unequally between the wires.

Other objects and advantages will be apparent from the following description and accompanying drawing.

BRIEF DESCRIPTION OF THE DRAWINGS

FIG. 1 represents a plan view of the prior art wire-wound polyurethane impregnated tie bar of U.S. Pat. No. 3,782,220.

FIG. 2 represents a cross sectional view taken on line 2—2 of FIG. 1.

FIG. 3 represents a plan view of a tie bar similar to FIG. 1 but embodying the present invention.

FIG. 4 represents a cross sectional view taken on line 4—of FIG. 3.

DESCRIPTION OF THE PREFERRED EMBODIMENT

Referring to FIG. 1, in particular, numeral 10 designates a flexible tie bar or coupling having a pair of spaced-apart end bushings 12 and 14 provided with openings 16 and 18, respectively, adapted to receive mating shafts or pins, not shown, forming part of the operating environment such as helicopter rotor structure, not shown, for which the tie bar 10 is particularly adapted. Each of the end bushings 12 and 14 are provided with integral spaced-apart retaining flanges 20 and 22 which are adapted to retain an endless belt 24 in position on bushings 12 and 14.

The endless belt 24 is formed of a plurality of wires or filaments 26 suitably integrated by suitable adhesive material as, for example, a polyurethane adhesive 28 such as disclosed in detail in U.S. Pat. No. 3,460,628 (common assignee). Longitudinally extending side portions 30 and 32 of belt 24 are encircled by spaced-apart clamps or clips 34 and 36 which occupy a position adjacent associated end bushings 12 and 14 and draw the side portions 30 and 32 toward the longitudinal axis A—A which axis extends through bushings 12 and 14 and about which axis the belt 24 twists under an applied torsional load on one of the bushings 12 and 14. Each clamp or clip 34 and 36 is preferably formed of two half sections 38 and 40 to facilitate assembling the clips 34 and 36 to belt 24. The half sections 38 and 40 are suitably notched as at 41 to receive side portions 30 and 32 and are fixedly secured together by a plurality of circumferential wrappings of wire or filament 42 which are received by a circumferential recess 44 in each clip 34 and 36.

The tie bar 10 in its operating environment on a helicopter must be capable of withstanding both tension and torsion forces imposed thereon and resulting from the centrifugal force generated by the rotor blade rotating about the rotor axis and twisting force generated by movement of the rotor blade about its longitudinal axis in response to pitch change actuating mechanism, not shown. The tension force p acts on the tie bar 10 resulting in a pair of force components one of which acts radially outwardly against half sections 38 and 40 tending to separate the same in opposition to the circumferential wire wrappings 42. The remaining force tends to urge clips 34 and 36 toward the center of the tie bar 10 which force must be resisted but, since low torsional resistance of the tie bar 10 is desirable, a solid non-deformable spacing member between clips 34 and 36 to maintain separation of the same is not desirable. Suitable spacing apparatus may be used as, for example, that referred to in U.S. Pat. No. 3,782,220 which includes wire wrappings 46 wound around each end bushing 12 and 14 and an adjacent pin or bar 48 which bears against associated clip 34 or 36. The pins or bars 48 and thus clips 34 and 36 bearing thereagainst are restrained from sliding toward each other by the wire wrappings 46 which also provide relatively low torsional resistance to twisting motion of the tie bar 10 about its longitudinal axis.

Referring to FIG. 2, it will be noted that the wires or filaments 26 of opposite sides of the endless belt 24 are deflected the same amount toward longitudinal axis A—A by the clips 34 and 36 due to the flat bearing surface of notch 41. When a torsion load is applied to the tie bar 10 causing twisting motion thereof, the wires 26 farthest from the axis A—A i.e., the edge wires 26 of belt 24, are stressed to a higher degree than the center wires i.e., wires 26 closest to the axis A—A. The stress variation is greatest under a condition of maximum operating twist of the tie bar 10. Preferably, the same stress condition should exist in each of the wires 26 at a maximum twist of tie bar 10. It is known that the operating load distribution of the wires may be equalized to a significant extent by suitable control over the tensile load applied to the wire 26 during the wrapping procedure of the wire 26 over the end bushings 12 and 14 which wrapping procedure is disclosed in U.S. Pat. No. 3,460,628 (common assignee) to which reference is made. However, variation of the wire 26 tension during the wrapping procedure requires a substantial increase in wrapping equipment as well as time and labor to produce the desired wrap condition of the tie bar 10 and therefore is not economically feasible.

Referring to FIGS. 3 and 4, structural elements identical to that of FIGS. 1 and 2 are identified by like numerals. With the exception of the clips 34 and 36, the tie bars of FIGS. 1 and 3 are the same. The half sections 38 and 40 are provided with convex or curved bearing surfaces 50 and 52, respectively, against which opposite sides of belt 24 bear thereby acquiring convex cross sectional shapes corresponding to the convex bearing surfaces 50 and 52. It will be noted that wires 26 are deflected progressively less toward axis A—A as the lateral extremities of the bearing surfaces or of the belt 24 are reached thereby decreasing the tension in the edge wires 26 accordingly relative to the tension in the center wires 26 located at the mid-section of belt 24. Thus, under the influence of a torsion load tending to twist the belt 24 about longitudinal axis A—A, the edge wires 26 are stressed to a lesser degree by virtue of the decreased load experienced thereby. It has been found from tests performed on a particular tie bar 10 that the maximum cyclic stress imposed on the wires 26 under tension and torsion load conditions is 58,020 psi and the mean stress of the wires 26 at the edges or lateral extremities of belt 24 is 108,100 psi. These stress values may be compared to that exhibited by the wires 26 in the prior art tie bar 10 shown in FIG. 1 wherein, under the same load condions, the stress values have been found to be 56,580 psi for maximum cyclic stress and 149,500 psi for the mean stress of edge wires 26. It will be recognized that the increase in cyclic stress, 1,440 psi, is negligible in comparison to the reduction in mean stress, 41,400 psi, of wires 26.

Various changes or modifications of the above described tension-torsion tie bar may be made as will be recognized by those persons skilled in the art without departing from the scope of applicant's invention as defined by the following claims.

I claim:

1. A tension-torsion tie bar comprising:
   a pair of spaced-apart bushings;
   an endless belt encircling said pair of bushings and including a plurality of windings of filament material arranged in spaced-apart parallel order and encased in an adhesive material;
   clamp means surrounding said belt intermediate said spaced-apart bushing and provided with opposing oppositely curved convex surfaces for urging opposite side portions of said belt together to establish a predetermined fixed spaced-apart relationship thereof;
   said opposing convex surfaces bearing against said opposite side portions of said belt to cause said side portions to bend transversely thereby reducing the deflection of the edge filaments relative to the deflection of the center filaments.

2. A tension-torsion tie bar as claimed in claim 1 wherein:
   said filament material is defined by a metal wire.

3. A tension-torsion tie bar as claimed in claim 1 wherein:
   said clamp means is defined by two mating sections adapted to be held in mating engagement by a plurality of windings of filament material wrapped therearound.

4. A tension-torsion tie bar as claimed in claim 1 wherein:
   said filament material is a metal wire and said adhesive material is polyurethane.

5. A tension-torsion tie bar as claimed in claim 1 wherein:
   said endless belt is adapted to twist under torsion load about a longitudinal axis passing through said bushings.

6. A tension-torsion tie bar as claimed in claim 3 wherein:
   said two mating sections are each provided with spaced-apart flange portions which with said two sections in engagement define an annular recess adapted to receive said plurality of windings of filament material holding said mating sections together.

* * * * *